(12) United States Patent
Gonthier et al.

(10) Patent No.: US 8,988,908 B2
(45) Date of Patent: Mar. 24, 2015

(54) CAPACITIVE POWER SUPPLY WITH SURGE CURRENT LIMITATION

(75) Inventors: Laurent Gonthier, Tours (FR); Antoine Passal, Monnaie (FR)

(73) Assignee: STMicroelectronics (Tours) SAS, Tours (FR)

( * ) Notice: Subject to any disclaimer, the term of this patent is extended or adjusted under 35 U.S.C. 154(b) by 84 days.

(21) Appl. No.: 13/326,849

(22) Filed: Dec. 15, 2011

(65) Prior Publication Data

US 2012/0155138 A1 Jun. 21, 2012

(30) Foreign Application Priority Data

Dec. 17, 2010 (FR) .................................. 10 60712

(51) Int. Cl.
*H02H 7/127* (2006.01)
*H02M 7/06* (2006.01)
*H02H 9/00* (2006.01)
*H02M 7/12* (2006.01)

(52) U.S. Cl.
CPC .............. *H02M 7/062* (2013.01); *H02H 9/001* (2013.01); *H02M 7/125* (2013.01)
USPC .......................................................... 363/52

(58) Field of Classification Search
CPC ....................................................... H02H 9/001
USPC ........... 363/52, 56.04, 56.06, 56.07; 323/325, 323/327, 319; 315/240, 360, 212, 291, 294, 315/224, 276, 361
See application file for complete search history.

(56) References Cited

U.S. PATENT DOCUMENTS

| | | | | |
|---|---|---|---|---|
| 3,588,599 A * | 6/1971 | Michalski | ................. | 315/200 R |
| 3,678,360 A * | 7/1972 | Minarik et al. | ................. | 388/821 |
| 3,947,751 A * | 3/1976 | Bray | ................. | 323/9 |
| 4,680,536 A * | 7/1987 | Roszel et al. | ................. | 323/321 |
| 4,980,649 A * | 12/1990 | Gulczynski | ................. | 330/10 |
| 5,239,203 A * | 8/1993 | Thorngren | ................. | 307/116 |
| 5,537,287 A * | 7/1996 | Dreier | ................. | 361/119 |
| 5,721,773 A * | 2/1998 | Debalko | ................. | 379/412 |
| 5,994,848 A * | 11/1999 | Janczak | ................. | 315/224 |
| 6,987,389 B1 * | 1/2006 | Macbeth et al. | ................. | 324/536 |
| 2004/0061452 A1* | 4/2004 | Konopka et al. | ................. | 315/209 R |
| 2006/0034109 A1 | 2/2006 | Benabdelaziz et al. | | |
| 2009/0290396 A1 | 11/2009 | Carcouet et al. | | |
| 2009/0310271 A1* | 12/2009 | Lee | ................. | 361/93.9 |
| 2010/0232193 A1 | 9/2010 | De Haan | | |
| 2011/0043121 A1* | 2/2011 | Matsuda et al. | ................. | 315/224 |

FOREIGN PATENT DOCUMENTS

JP 2000134792 A 5/2000

OTHER PUBLICATIONS

French Search Report and Written Opinion dated Jul. 26, 2011from corresponding French Application No. 10/60712.

* cited by examiner

*Primary Examiner* — Matthew Nguyen
*Assistant Examiner* — Trinh Dang
(74) *Attorney, Agent, or Firm* — Allen, Dyer, Doppelt, Milbrath & Gilchrist, P.A.

(57) ABSTRACT

A capacitive power supply including: a first capacitive element and a first resistive element in series between a first terminal of a power switch and at least one rectifying element having a second terminal connected to a first electrode of at least one second capacitive element for providing a D.C. voltage; and a bidirectional switch in parallel on the resistor.

20 Claims, 4 Drawing Sheets

CAPACITIVE POWER SUPPLY WITH SURGE CURRENT LIMITATION

CROSS REFERENCE TO RELATED APPLICATIONS

This application claims the priority benefit of French patent application number 10/60712, filed on Dec. 17, 2010, entitled CAPACITIVE POWER SUPPLY WITH SURGE CURRENT LIMITATION, which is hereby incorporated by reference to the maximum extent allowable by law.

BACKGROUND

1. Technical Field

Embodiments generally relate to electronic circuits and, more specifically, to circuits for generating D.C. voltages based on an A.C. voltage. Embodiments more specifically apply to capacitive power supplies and to diode bridge power supplies.

2. Discussion of the Related Art

Power supplies are widely used in electronics and are used to generate one or several D.C. power supply voltages from an A.C. voltage. Such power supplies are most often directly connected to the electric distribution mains via a power switch. As a result, the powering-on of the power supply circuit is not synchronized with the zero crossing of the A.C. power supply voltage, which generates current peaks. A surge current limiting element (most often, a resistor) is thus generally provided.

A problem is that such a current-limiting element generates a permanent dissipation in the power supply circuit, including in steady state, which is not desirable.

SUMMARY

An aim of an embodiment is to overcome all or part of the disadvantages of known power supply circuits.

Another aim of an embodiment is to provide a power supply circuit in which the dissipation in a surge current limiting element is low.

Another aim of an embodiment is to provide a self-contained circuit requiring no complex control.

To achieve all or part of these and other aims, an embodiment provides a capacitive power supply comprising:

a first capacitive element and a first resistive element in series between a first terminal of a power switch and at least one rectifying element having a second terminal connected to a first electrode of at least one second capacitive element for providing a D.C. voltage; and a bidirectional switch in parallel on the resistor.

According to an embodiment, said bidirectional switch is a triac.

According to an embodiment, a control electrode of the triac is grounded via an element setting a threshold voltage.

According to an embodiment, the element setting a threshold voltage is a diac.

According to an embodiment, the power supply further comprises a third capacitive element between a power terminal of the triac on the D.C. voltage side and the ground.

According to an embodiment, the power supply further comprises a circuit capable of short-circuiting the third capacitive element.

According to an embodiment, the voltage threshold setting element sets the values of the D.C. voltages.

According to an embodiment, capable of providing D.C. voltages of reverse polarities, two rectifying elements and two second capacitive elements are respectively assigned to each polarity.

The foregoing and other objects, features, and advantages will be discussed in detail in the following non-limiting description of specific embodiments in connection with the accompanying drawings.

DETAILED DESCRIPTION

Figure 1:
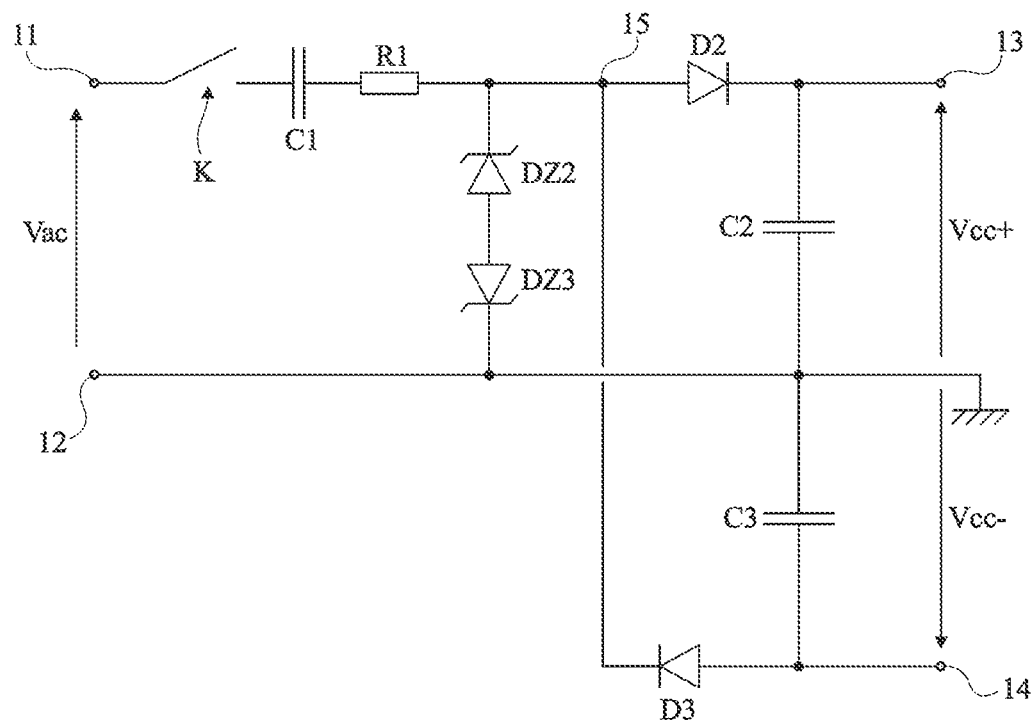
FIG. 1 is an electric diagram of a usual capacitive power supply circuit.

The same elements have been designated with the same reference numerals in the different drawings, and the timing diagrams have not been drawn to scale. For clarity, only those elements which are useful to the understanding of the embodiments have been shown and will be described. In particular, what exploitation is made of the voltages generated by the power supply circuit has not been detailed, the embodiments being compatible with usual applications.

FIG. 1 is an electric diagram of an embodiment of a capacitive power supply circuit. The example of FIG. 1 relates to a power supply intended to generate positive and negative D.C. voltages Vcc+ and Vcc−. The circuit is intended to be connected to two terminals 11 and 12 for applying an A.C. voltage Vac and is based on the use of a series capacitor C1 and of parallel capacitors C2 and C3 respectively assigned to the positive and negative power supply voltages. Capacitor C1 is connected, via a power switch K, to terminal 11 and, by its other electrode, to a resistor R1 for limiting the surge current. The other terminal 15 of resistor R1 is connected, via a diode D2, to a first electrode of capacitor C2 having its other electrode directly connected to terminal 12, which also defines the ground of the D.C. power supply. The junction point of diode D2 (its cathode) and of capacitor C2 is directly connected to an output terminal 13 providing the positive potential of D.C. voltage Vcc+. On the negative D.C. power supply side, capacitor C3 is connected between a terminal 14 for providing a negative voltage and ground 12. A diode D3 is connected between terminal 14 and the anode of diode D2 (corresponding to one of the terminals of resistor R1), the anode of diode D3 being on the side of terminal 14. The respective values of the positive and negative power supply voltages are set by two zener diodes DZ2 and DZ3, series-connected between the respective anode and cathode of diodes D2 and D3 and the ground. Diodes DZ2 and DZ3 are connected in opposition, that is, they have common anodes. As a variation, their cathodes may be common The function of capacitor C1 is to set the current of the capacitive power supply. The function of resistor R1 is to limit the surge current in the capacitor when switch K is on. The operation of such a capacitive power supply is known. For each halfwave of the A.C. voltage, according to the sign of this halfwave, one of the two capacitors C2 or C3 is charged by the flowing of a current through capacitor C1, resistor R1, and the corresponding diode D2 or D3.

The presence of resistor R1 generates a permanent dissipation in steady state in the power supply circuit. Such dissipation adversely affects the system efficiency since this resistor is only used to turn on switch K, for the time required by voltages Vcc+ and Vcc− to settle. This duration is negligible as compared with the duration for which the capacitive power supply is in operation.

Figure 2:
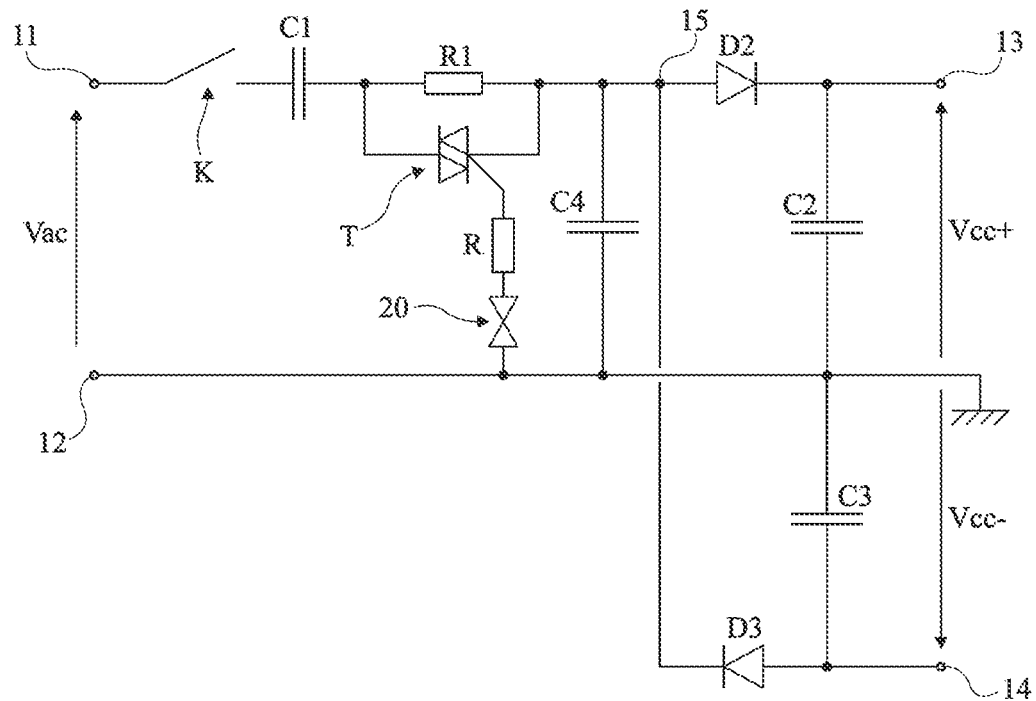
FIG. 2 is an electric diagram of an embodiment of a capacitive power supply circuit.
Figure 3:
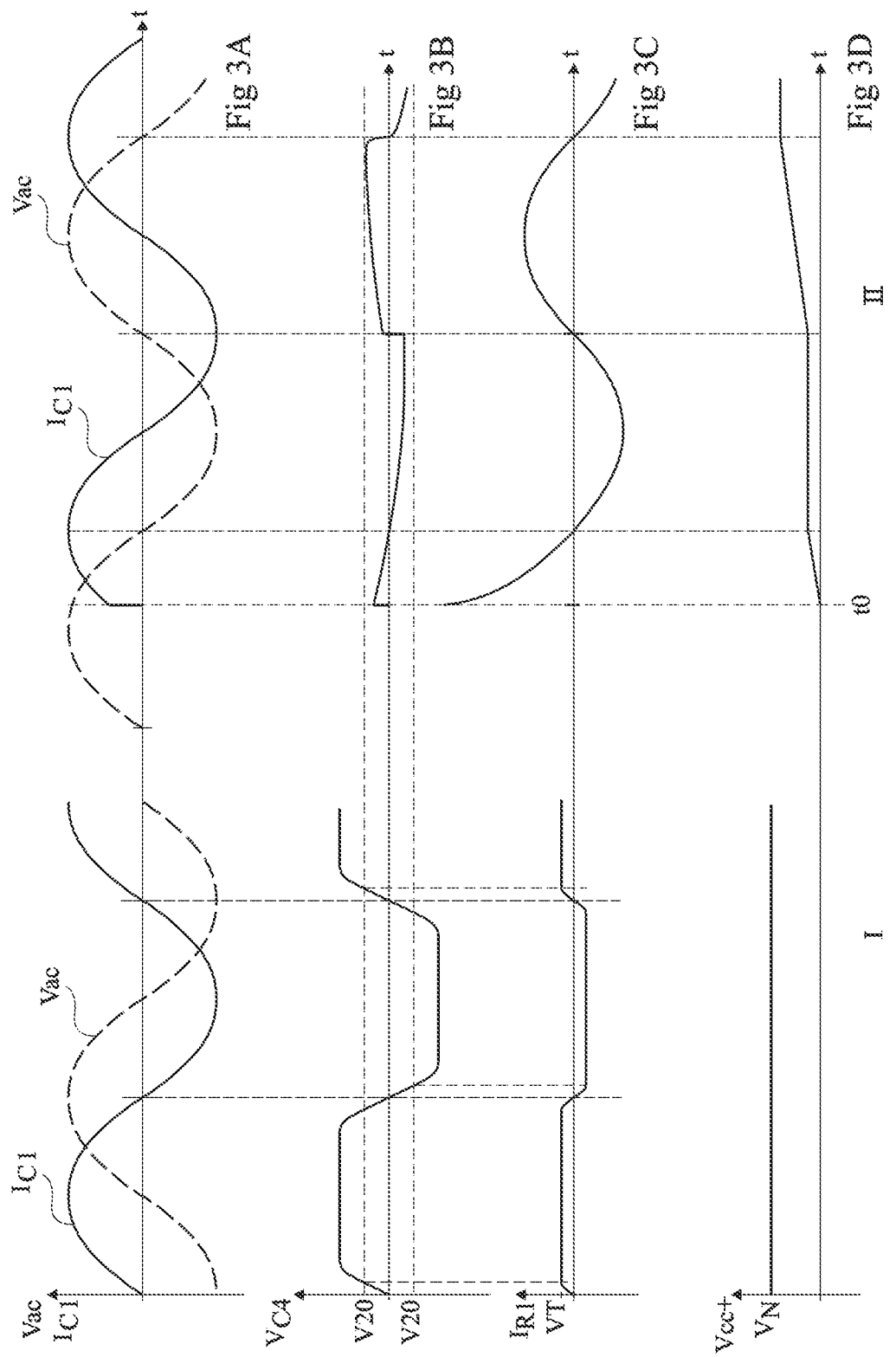
FIGS. 3A, 3B, 3C, and 3D are timing diagrams illustrating, in steady state and at the powering-on, the operation of the circuit of FIG. 2.

FIG. 2 shows an embodiment of a capacitive power supply circuit.

It shows the series connection of power switch K with capacitive element C1 setting the current of the capacitive power supply, and with resistor R1. Again as previously, this series-connected group is connected between a first terminal 11, which an A.C. voltage Vac is applied, and the respective anode and cathode of two rectifying elements (for example, diodes D2 and D3) having their respective cathode and anode connected to terminals 13 and 14 for respectively providing a positive and a negative D.C. voltage Vcc+ and Vcc−, capacitive elements C2 and C3 connecting respective terminals 13 and 14 to ground 12.

According to this embodiment, a triac T in parallel with resistor R1 is provided. This triac is intended to short-circuit resistor R1 in steady state. A resistive element or an inductance may be in series with triac T to limit the di/dt in case of a break-over. The triac is controlled by an element setting a threshold voltage, for example, a diac 20 series-connected with a resistive element R, between the gate of triac T and terminal 12. Finally, a capacitive element C4 grounds the power terminal of the triac on the anode and cathode side of diodes D2 and D3. The function of capacitive element C4 is to provide a power supply voltage enabling a gate current to flow through the triac and allowing its turning-on.

FIGS. 3A, 3B, 3C, and 3D are timing diagrams illustrating the operation of the circuit of FIG. 2. The drawings show, in their left-hand portion I, the circuit operation in steady state and, in their right-hand portion II, the circuit operation when it is powered on by the closing of switch K in the middle of a halfwave of power supply voltage Vac.

FIGS. 3A to 3D respectively show examples of shapes of voltage Vac (dotted lines) or of current $I_{C1}$ (full line) in capacitor C1, which has a similar, though phase-shifted, shape, of voltage $V_{C4}$ across capacitor C4, of current $I_{R1}$ in limiting resistor R1, and of voltage Vcc+. Voltage Vcc−, not illustrated, is obtained by a similar operation.

In steady state (left-hand portion I of the timing diagrams), for each halfwave of voltage Vac, triac T turns on as soon as voltage $V_{C4}$ reaches threshold V20 set by diac 20. The current in resistor $I_{R1}$ is thus limited, during this steady state, to the quotient of the value of voltage VT across the triac and that of this resistor. In steady state, voltage Vcc+ has its nominal value $V_N$. In the example of FIG. 2, this value is set by the threshold voltage of diac 20. It can thus be advantageously acknowledged that diodes DZ2 and DZ3 may be omitted. As a variation, and especially if the threshold of diac 20 is greater than the desired D.C. power supply voltages, or if positive and negative levels of different values are desired, it may be provided to add zener diodes of the type of diodes DZ2 and DZ3 to the circuit of FIG. 2.

In right-hand portion II of the timing diagrams of FIGS. 3A to 3D, a turning-on of switch K is assumed at a time t0 during a positive halfwave of voltage Vac. This results in a current peak absorbed by resistor R1. Capacitors C2 and C3 being initially discharged, voltage to Vcc+ progressively increases with each halfwave of the power supply voltage. Voltage $V_{C4}$ cancels at each zero crossing of the A.C. power supply voltage and its value at the end of the halfwave progressively increases with each halfwave. However, over the shown halfwaves, it does not reach threshold voltage V20 yet. Accordingly, triac T remains off and resistor R1 conducts a current having the shape of voltage Vac. Once threshold V20 has been reached, a steady state is entered such as illustrated in portion I. Capacitor C4 is used as a reservoir to provide the gate current necessary to the triac. The peak voltage across it corresponds to threshold voltage V20 of diac 20, plus the gate-cathode voltage of triac T and the voltage drop in resistor R. Voltage Vcc+ and voltage Vcc− are thus limited to this same value.

Figure 4:
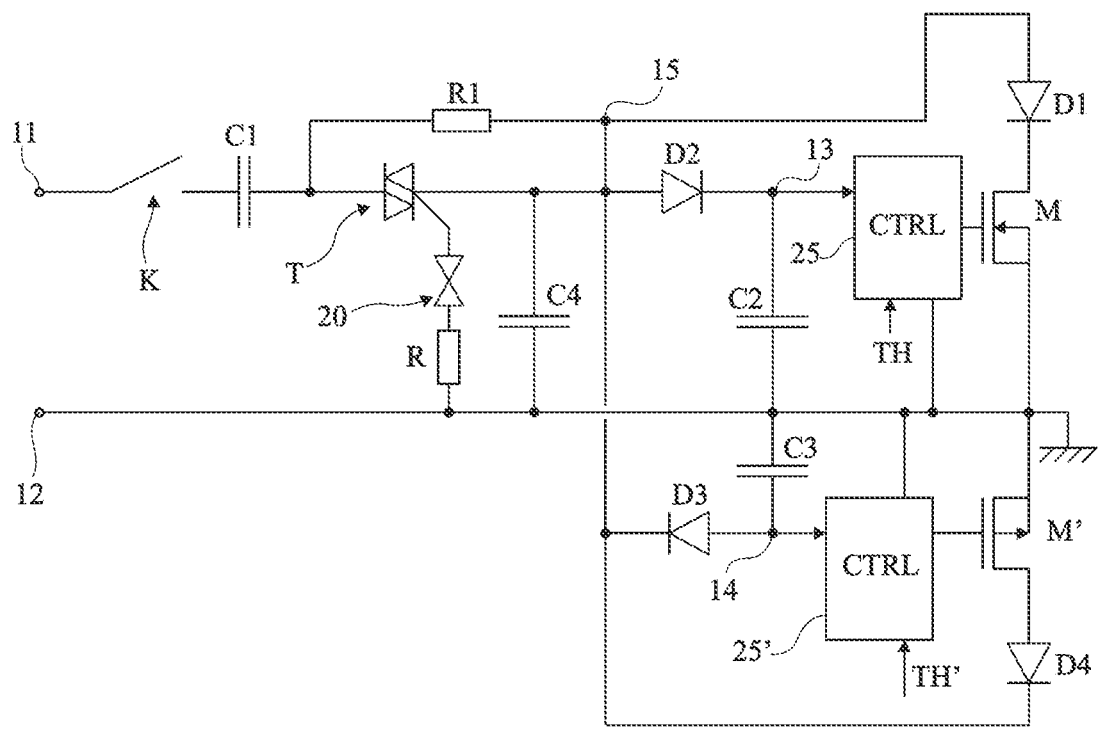
FIG. 4 shows another embodiment of a capacitive power supply circuit.

FIG. 4 shows another embodiment of a capacitive power supply circuit. As compared with the embodiment of FIG. 2, a switch (in the example, a MOS transistor M but any other switch technology is suitable) is provided to short-circuit capacitor C4 and discharge it. Transistor M is series-connected with a rectifying diode D1 between the anode 15 of diode D2 and the ground and is controlled by a circuit 25 (CTRL) receiving a reference value in the form of a threshold TH. A dissipation resistor may be interposed in this series connection to relieve transistor M. Control circuit 25 is powered by voltage Vcc+ (terminal 13). Its function is to short-circuit capacitor C4 when power supply voltage Vcc+ reaches a sufficient threshold. Such an embodiment enables, for example, a diac 20 to be used having a threshold value different from the desired power supply voltages or to avoid losses due to the current flowing through the diac.

A similar circuit is provided on the negative power supply side, where a switch (for example, a MOS transistor M'), in series with a diode D4 grounds the cathode of diode D3 (the anode of diode D2), the anode of diode D4 being on the ground side. Transistor M' is controlled by a circuit 25' (CTRL) powered by voltage Vcc− (terminal 14) and receiving a reference value, for example, in the form of a threshold TH'.

The embodiments which have been described enable the dissipation in the capacitive power supply circuit to be limited by guaranteeing a limitation of the capacitive surge current. The use of a diac is a preferred embodiment since this eases the monolithic forming of the triac control circuit. However, as a variation, two zener diodes in parallel with reverse biasings between the triac gate and the ground may be provided (with, if present, resistor R in series). Associations of thyristors or of bipolar transistors and zener diodes may also be considered.

Embodiments described above in connection with a capacitive power supply can also be used for other types of DC/DC converters.

Figure 5:
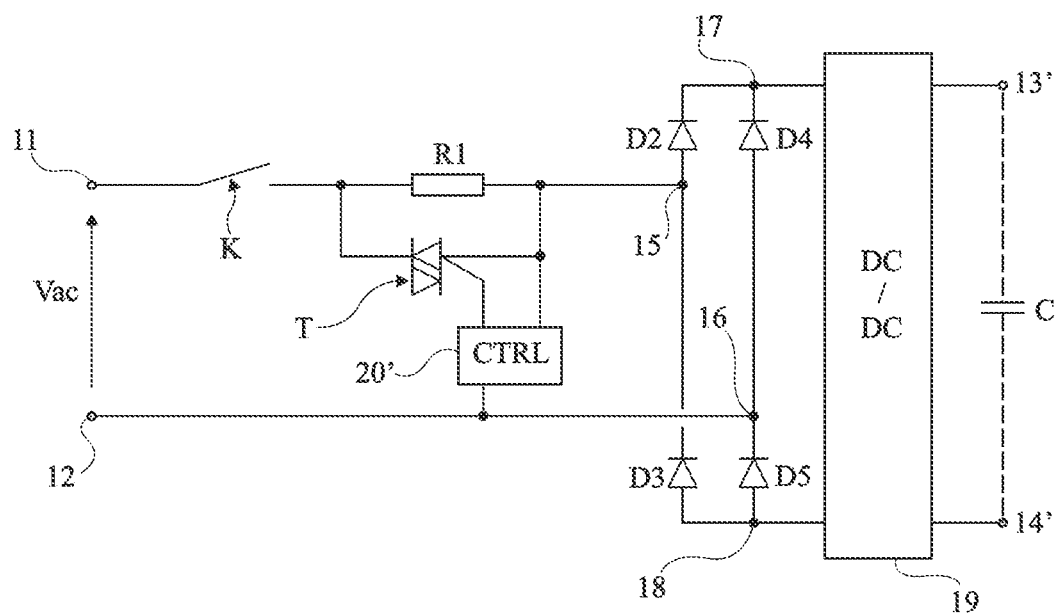
FIG. 5 shows another embodiment of a power supply circuit.

FIG. 5 shows an embodiment of a power supply circuit with a diode bridge.

As in the previous embodiments, the circuit is intended to be connected to two terminals 11 and 12 across which an AC voltage Vac is applied, and uses a resistor R1 for limiting the surge current. A first terminal of resistor R1 is connected to terminal 11 through power switch K. The other terminal of resistor R1 is connected to a first input terminal 15 of a diode bridge, a second input terminal 16 of which is directly connected to terminal 12. The diode bridge comprises four diodes D2 to D5. Diodes D2 and D3 are connected in series between first and second output terminals 17 and 18 of the diode bridge, the mid-point between these series-connected diodes being connected to input terminal 15. Diodes D4 and D5 are connected in series between terminals 17 and 18, the midpoint between these series-connected diodes being connected to input terminal 16. A DC/DC converter 19 is connected between terminals 17 and 18 and provides, at its outputs 13' and 14', a DC voltage. A capacitor C may be connected between terminals 13' and 14'.

As in the previous embodiments, a bidirectional switch T, for example a triac, is connected in parallel with the resistor R1. The control electrode of the triac is connected to the terminal 12 via a control circuit 20' (CTRL) controlling the conduction periods of the triac. Control circuit 20' may require a connection to terminal 15 for power supply. The aim of the control circuit 20' is to switch on the triac T when the voltage between terminals 15 and 16 reaches a sufficient level.

As an example, the control circuit 20' can be formed by resistor R and diac 20 as in the embodiments of FIGS. 2 and 4. As a variant, the control circuit 20' is an element setting a threshold voltage for controlling the triac T.

Figure 6:
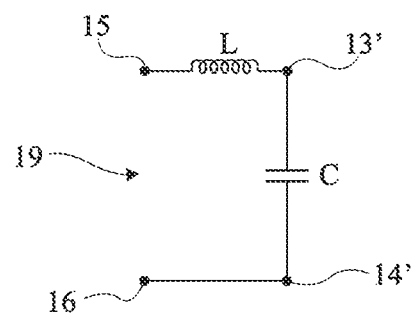
FIG. 6 shows an embodiment of a DC/DC converter of FIG. 5.

FIG. 6 shows an exemplary embodiment of a DC/DC converter 19, and more particularly, a passive power factor corrector (PFC). An inductive element L is connected between terminals 15 and 13', and the rest of the circuit is identical to the embodiment of FIG. 5. Other types of DC/DC converters can be used.

Figure 7:
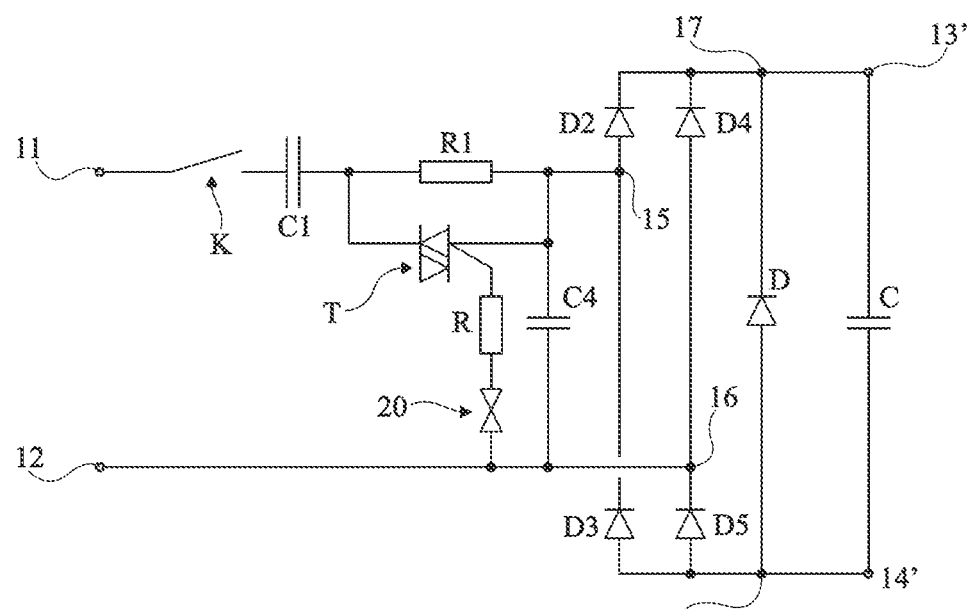
FIG. 7 shows another embodiment of a capacitive power supply circuit with a diode bridge.

FIG. 7 shows another embodiment using a diode bridge and forming a capacitive power supply. With respect to the embodiment of FIG. 5, a capacitor C1 is connected between switch K and resistor R1 as in the embodiments of FIGS. 2 and 4. Furthermore, an additional diode D is connected between terminals 17 and 18, terminals 13' and 17 being directly connected to each other, and terminals 14' and 18 being also directly connected to each other.

In the embodiments of FIGS. 5 and 7, terminal 14' provides the reference voltage and terminal 13' is a positive voltage terminal.

The powering of the control circuit is, in the embodiments of FIGS. 2, 4 and 7, provided by a capacitor C4. In other embodiments, especially for higher voltages, a dedicated supply circuit for the control circuit 20' is provided.

Various embodiments have been described, various alterations and modifications will occur to those skilled in the art. In particular, although the embodiments have been described in more detail in relation with a capacitive power supply circuit adapted to positive and negative voltages, it of course applies to a capacitive power supply only having a positive or negative polarity. Further, the described embodiments are compatible with the variations generally used to form rectifying elements, resistors, and capacitive elements in integrated fashion. Further, triac T may be replaced with any adapted bidirectional switch and any adapted circuit for controlling such a switch may be considered. Finally, the described embodiments are compatible with other options capable of usually equipping power supply circuits.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power supply circuit, comprising:
   a first resistive element in series between a first terminal of a power switch and a mid-point between a first pair of series-connected rectifying elements;
   a DC/DC converter connected at the terminals of the first pair for providing a DC voltage;
   a triac in parallel with the first resistive element;
   a control circuit adapted to control the triac, the control circuit including an element setting a threshold voltage above which the triac is controlled to conduct during a steady-state operation of the power supply circuit, and below which the triac is controlled not to conduct during a power-on operation of the power supply circuit, wherein the control circuit is connected to the triac and an AC power terminal; and
   at least one zener diode connected between the AC power terminal and the mid-point between the first pair of series-connected rectifying elements.

2. The power supply of claim 1, further comprising a second pair of series-connected rectifying elements in parallel with the first pair, a second terminal of said power switch and a mid-point of said second pair being respectively connected to first and second terminals for applying an AC voltage.

3. The power supply of claim 1, further comprising a first capacitive element connected between said first switch and said first resistive element to form a capacitive power supply.

4. The power supply of claim 1, wherein a control electrode of the triac is grounded via the element setting a threshold voltage.

5. The power supply of claim 1, further comprising a third capacitive element between a power terminal of the triac on the D.C. voltage side and ground.

6. The power supply of claim 1, further comprising a second resistive element or an inductance connected in series with the triac.

7. The power supply of claim 1, wherein the control circuit is arranged between the triac and the AC power terminal.

8. The power supply of claim 1, wherein a first terminal of the control circuit is connected to a control terminal of the triac and a second terminal of the control circuit is connected to the AC power terminal.

9. The capacitive power supply of claim 3, wherein a second capacitive element is coupled to said terminals of said first pair.

10. The capacitive power supply of claim 3, wherein said element setting a threshold voltage is a diac.

11. The capacitive power supply of claim 3, wherein the capacitive power supply is configured to provide D.C. voltages of reverse polarities, and wherein two rectifying elements and two second capacitive elements are respectively assigned to each polarity.

12. The power supply of claim 4, wherein the element setting the threshold voltage sets values of D.C. voltages.

13. The power supply of claim 5, further comprising a circuit capable of short-circuiting the third capacitive element.

14. A method of protecting a power supply circuit from a power surge, the method comprising:
   shorting, by a triac arranged in parallel with a first resistive element connected in series with a power switch, across the first resistive element, wherein the shorting is performed based on a control signal provided by a control circuit, wherein the control circuit is connected to the triac and an AC power terminal, and wherein the control circuit is configured to control the triac to conduct only during a steady-state operation of the power supply circuit
   providing a positive DC voltage and a negative DC voltage having different values by connecting at least one zener diode between the AC power terminal and a mid-point between a first pair of series-connected rectifying elements.

15. The method of claim 14, further comprising:
grounding a control electrode of the triac via an element of the control circuit.

16. The method of claim 14, further comprising generating the control signal based, at least in part, on a threshold voltage associated with one or more elements of the control circuit.

17. The method of claim 15, wherein the grounding the control electrode of the triac comprises connecting a diac between the control electrode and ground.

18. The method of claim 16, further comprising:
determining whether the threshold voltage is exceeded; and
sending the control signal to the control electrode of the triac to cause the triac to conduct after determining that the threshold voltage is exceeded.

19. The method of claim 16, further comprising limiting di/dt by a second resistive element or an inductance connected in series with the triac.

20. The method of claim 17, wherein the grounding the control electrode of the triac further comprises connecting a second resistive element between the diac and the control electrode.

* * * * *